Oct. 16, 1962   C. M. BREINER   3,058,157
BEAD RING ATTACHMENT FOR TIRE MOLDS
Filed March 8, 1960   3 Sheets-Sheet 1

Carl M. Breiner
INVENTOR.

BY *Clarence A. O'Brien
and Harvey B. Jacobson*
Attorneys

Oct. 16, 1962  C. M. BREINER  3,058,157
BEAD RING ATTACHMENT FOR TIRE MOLDS
Filed March 8, 1960  3 Sheets-Sheet 2
Fig. 3
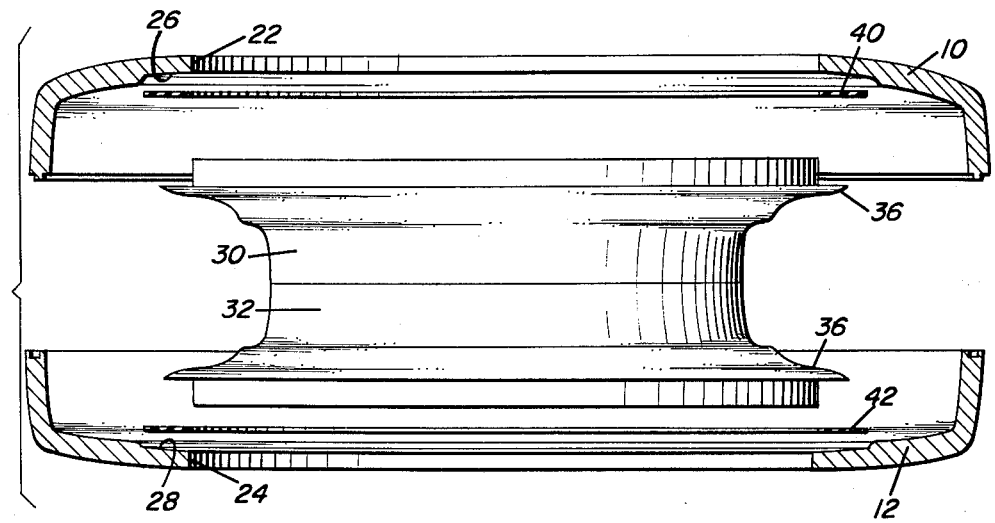
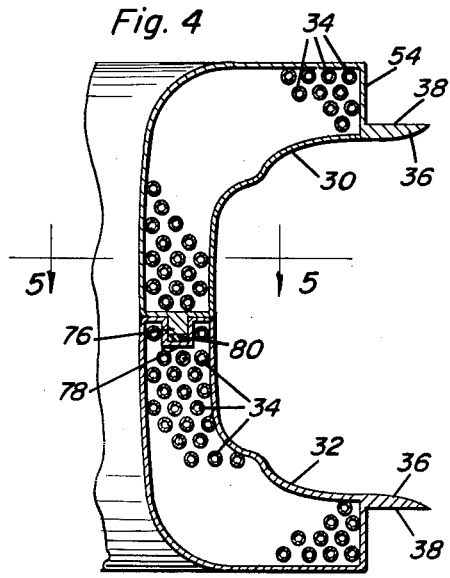
Fig. 4
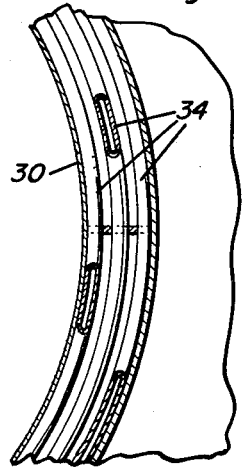
Fig. 5
Carl M. Breiner
INVENTOR.
BY *Clarence A. O'Brien*
and *Harvey B. Jacobson*
Attorneys Oct. 16, 1962  C. M. BREINER  3,058,157
BEAD RING ATTACHMENT FOR TIRE MOLDS
Filed March 8, 1960  3 Sheets-Sheet 3

Carl M. Breiner
INVENTOR.

United States Patent Office 3,058,157
Patented Oct. 16, 1962

3,058,157
BEAD RING ATTACHMENT FOR TIRE MOLDS
Carl M. Breiner, General Delivery, Seabeck, Wash.
Filed Mar. 8, 1960, Ser. No. 13,610
6 Claims. (Cl. 18—38)

This invention comprises a novel and useful bead ring attachment for tire molds and more particularly relates to an attachment adapted to be secured to tire molds to facilitate and effect a more precise control of the vulcanizing and/or curing operations performed in connection with the retreading or rebuilding of tires.

A number of conventional tire molds are now in use for the purpose of retreading or rebuilding tires of either the conventional tube type of tire or the more recently developed tubeless type of tire now attaining widespread use. In molds of this type it has been heretofore common to employ a curing bag resembling the usual inner tube of a tire which is disposed inside the tire when the latter is placed in the mold in order to inflate the tire against the matrices of the mold and thus produce the desired tread upon the tire during the vulcanizing and/or curing operation. However, such curing bags, which are required for the retreading or rebuilding of tires of the inner tube type since such tire casing are not sufficiently air-tight, have a relatively short period of use. It has now become customary to dispense with this curing bag in the retreading or rebuilding of tires of the tubeless type since the casings of such tires are ordinarily sufficiently airtight to themselves retain the fluid pressure applied to the interior thereof for expanding the tire firmly against the matrices of the mold.

It is therefore the principal object of this invention to provide a bead ring attachment for tire molds which are especially adapted for the retreading or rebuilding of tubeless tires and which shall enable the tire mold to more effectively and precisely effect the retreading and the vulcanizing and/or curing operations of such tires.

It is a further important object of the invention to provide a bead attachment for tire molds of the sectional type which when mounted upon the tire mold sections will provide an additional support for the side wall portions and the bead portions of the tire during the retreading, vulcanizing and during operations to be performed thereon.

A further object of the invention is to provide a bead attachment in accordance with the foregoing objects which will enable tires having damaged side wall and tread portions to be adequately supported so as to enable the retreading and/or rebuilding operation to be satisfactorily performed thereon.

Yet another object of the invention is to provide a bead ring attachment for tire molds of the sectional type which will enable a more accurate control of the temperatures applied to the opposite side walls and bead portion of a tire to thereby effect a better vulcanizing and/or curing operation thereon.

Another object of the invention is to provide a bead ring attachment for tire molds in accordance with the foregoing objects which will enable tires of different diameter to be readily handled and treated in the same mold thereby avoiding the previous necessity for providing different sets of bead rings for different diameter sizes of tires.

A further object of the invention is to considerably reduce the number of parts required to be applied to the tire mold sections in order to attach the bead rings to support the side walls and bead portions of a tire to be vulcanized.

Still another object of the invention is to provide a bead ring attachment for tire molds of the sectional mold type which will simplify the attachment and the disconnection of the various fluid supply lines.

A further and very important object of the invention is to provide a bead ring attachment for tire molds which shall consist of a pair of complementary bead rings each adapted to be independently connected to a tire mold section and each of which is separately supplied with the system for the circulating of a heat treating fluid to effect an independent control of the temperature of the side wall and bead portions of a tire during the vulcanizing and/or curing operations thereon.

Still another object of the invention is to provide a bead ring attachment in accordance with the immediately preceding object and which shall have improved means for effecting a fluidtight seal engagement between the complementary faces of the bead rings.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a diagrammatic view showing in vertical section the upper and lower sections of a tire mold which are slightly spaced from each other and showing the bead ring attachment of this invention disposed therebetween together with the insulating gaskets which are employed in connection therewith;

FIGURE 4 is a fragmentary view in vertical section through a portion of the bead ring attachment of this invention, the attachments being shown in their closed position as in FIGURES 1 and 2;

FIGURE 5 is a horizontal sectional view taken substantially upon the plane indicated by section line 5—5 of FIGURE 4.

Figure 1:
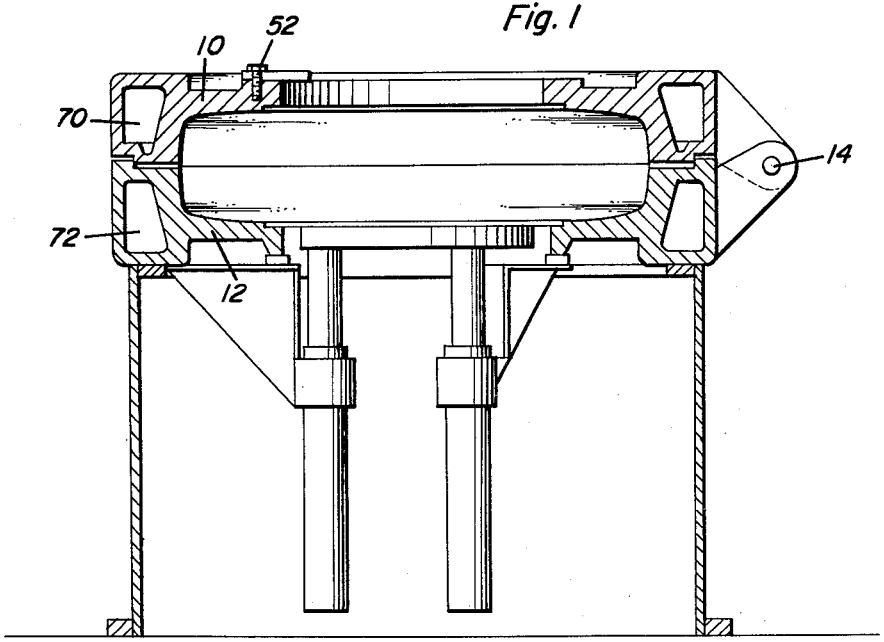
FIGURE 1 is a view in vertical section and elevation of a conventional form of a tire retreading or rebuilding mold of the sectional mold type and to which the attachment of the present invention is applied.
Figure 2:
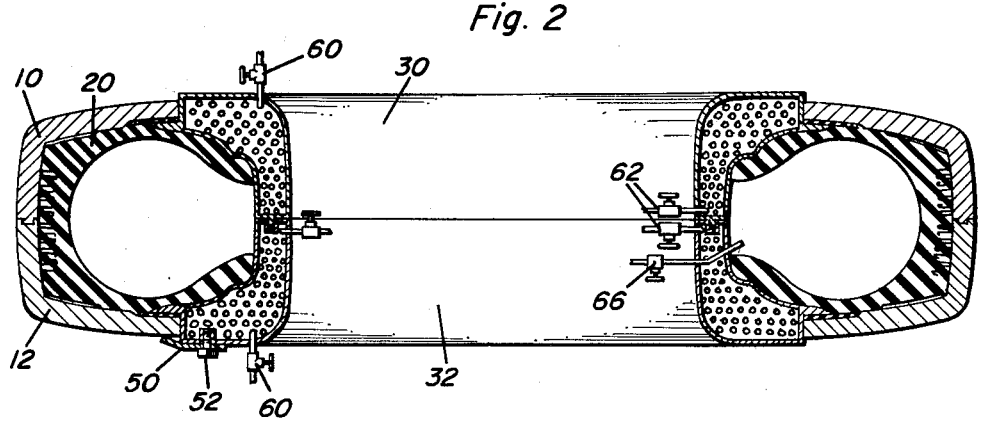
FIGURE 2 is a view in vertical longitudinal section taken diametrically through the tire mold of FIGURE 1 and showing the position of the parts with a tire to be retreaded confined therein, the mold matrices being omitted from this drawing in order to simplify the showing thereof.
Figure 6:
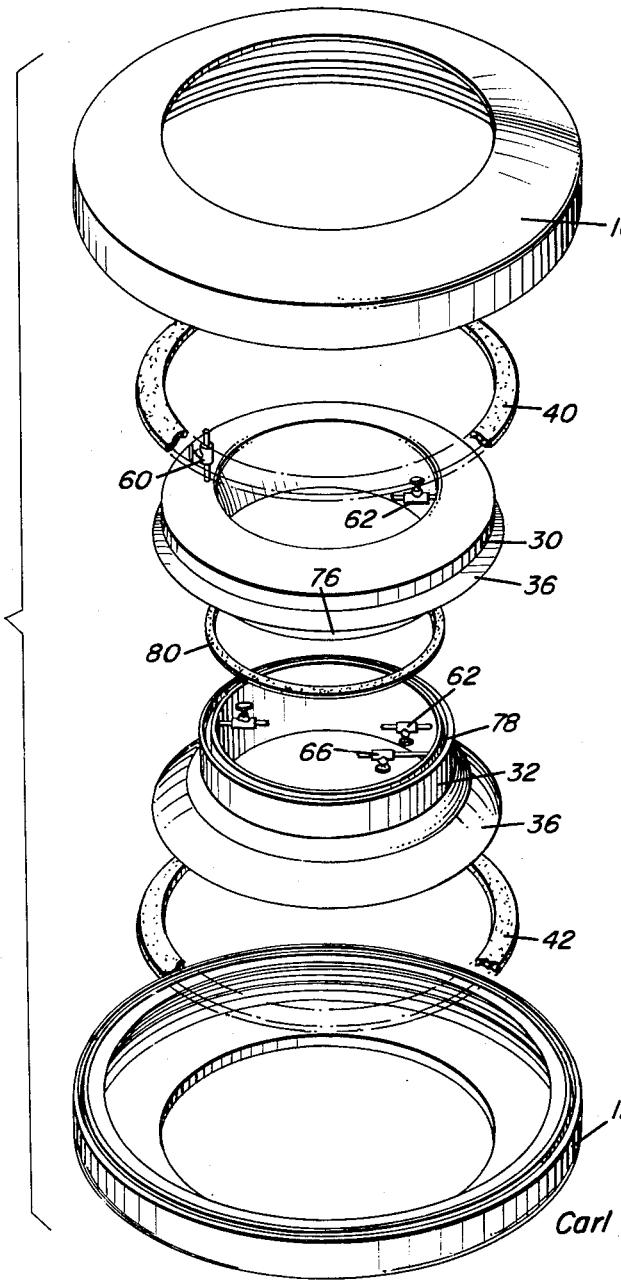
FIGURE 6 is an exploded perspective view of the bead ring attachment of this invention and the tire mold sections with which the invention is to be employed.

In the accompanying drawings, attention is directed first to FIGURE 1 wherein there is shown a conventional form of a tire retreading or repairing mold the same including upper and lower mold sections 10 and 12 respectively, which are hingedly connected together as at 14 whereby the upper section may be raised or lowered relative to the lower section for confining therebetween, as shown in FIGURE 2, a tire 20 which is to be retreaded or repaired.

Referring now to FIGURE 2 it will be observed that when the tire 20 is disposed inside the lower mold section, and the upper mold section 10 closed down thereon, the tire is confined therebetween so that the matrices, not shown, carried by the two mold sections will impart the desired contour to the tread and/or side wall portions of the tire.

Considering now FIGURE 3 it will be seen that the upper and lower mold sections 10 and 12 are povided with axially disposed central openings 22 and 24 therethrough and that the inside surfaces of these mold sections are provided with recessed seating surfaces as at 26 and 28 respectively. Use is made of this conventional construction for incorporating with the mold sections an attachment consisting of bead rings and which forms the subject matter of the present invention.

The bead ring attachment consists of complementary upper and lower bead rings as at 30 and 32 which are of reversed identical configuration. Each attachment, as will be seen from FIGURE 4 consists of an annular hollow body which has a plurality of tubes as at 34 in each of the bead rings. These tubes extend throughout the entire hollow interior of the bead rings which thus constitute a hollow casing for receiving these tubes. Upon the inner periphery of the bead rings 30 and 32 and upon the side walls thereof there are provided annular flanges as at 36, each of which has a flat sealing surface 38 so that the flanges are adapted to be received in the recesses 26 and 28 of the mold sections with the surfaces 38 adapted to seat against the surfaces 26 or 28. In order to facilitate the establishing of a fluid tight seal between these surfaces there are provided washers 40 and 42 of asbestos or other suitable heat insulating material which thus prevents transmission of heat from the material of the bead rings 30 and 32 directly to the casing sections 10 and 12 through the flanges 36.

Although the bead rings 30 may be of any suitable material it is preferred to form the same of aluminum in the interest of establishing a good heat transfer relation between the inner surfaces of the rings 30 and 32 and the adjacent outer side wall and bead portions of the tire 20, as shown in FIGURE 2.

In order to secure each of the bead rings 30 and 32 to its associated mold sections 10 or 12, there is provided, as shown in FIGURE 2 a plurality of securing means in the form of brackets 50 each secured as by a screw 52 to the outer surfaces on the outer side walls of the bead rings, with these brackets overlying the outer side walls of the mold sections 10 and 12 as suggested in FIGURES 1 and 2. Thus, by the use of these screws and brackets each of the bead rings 30 and 32 is disposed with its diametrically reduced annular upper portion 54 extended into or through the openings 22 and 24 of the casing sections 10 and 12 and with the seats 38 of the flanges 36 pressed against the seats 26 and 28 of the mold sections with the heat insulating gaskets 40 and 42 interposed therebetween.

There are also provided valve fittings 60 and 62 for the upper and lower bead rings 30 and 32, and which fittings serves as a means to circulate a heat exchange fluid through the tubes 34 in the bead rings. Conveniently, the fitting 60 can constitute an inlet means for supplying hot steam or water or hot water while the fitting 62 constitutes a discharge means therefor. Thus, a heat fluid can be supplied to the interior of the bead rings to apply heat at a desired and precisely controlled temperature to the side wall and bead portions of the tire casing 20 disposed thereagainst. It will be observed that by this means the tube bead rings can be maintained at different temperatures as desired, and that the bead rings are further capable of being maintained at different temperatures from that of the rest of the mold section heating jackets indicated by the numerals 70 and 72 in FIGURE 1. Thus, a very precise control of the temperature applied to the different portions of a tire casing can be attained and thereby produce the most effective vulcanizing and/or curing operation upon the tire.

It will be further noted that the fittings 60 and 62 can also be employed as a means for circulating a coolant through the bead rings or to cool the tire after the heating operation has been completed, if desired.

There is also provided in at least one of the bead rings such as the bead ring 32 a further fitting as at 66 which is used to introduce compressed air or other fluid under pressure to the interior of the tire casing for expanding the same tightly outwardly against the matrices of the mold sections and the bead rings 30 and 32. Correspondingly, the same means can be employed to discharge or release the fluid pressure after its service is no longer required.

In order to effect a fluid tight seal between the two complementary bead rings, there is provided, as shown more clearly in FIGURE 4, a complementary annular rib or tongue as at 76 on the section 30 complementary channels as at 78 on the section 32 which receives this tongue, a further sealing means in the form of a neoprene ring 80 being disposed in this channel therebetween. The arrangement is such that when the two mold sections are brought together, the compression force applied to the tube bead rings 30 and 32 establish fluid-tight seal by means of the gaskets 40 and 42 between the flanges 36 of the bead rings and the mold sections 10 and 12; and also compresses the ring 80 to establish a fluid-tight seal between the tongue and groove connections between the two bead rings.

For convenience, the fluid inlet fitting 60 may be disposed upon the outer side walls of the bead rings 30 and 32, while the fluid discharge means 62 may be disposed upon cylindrical internal periphery of the same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bead ring attachment for tire molds of the type having two complementary mold sections for confining therebetween a tire to be vulcanized comprising; a pair of complementary bead rings directly engaging each other and adapted to embrace and support therebetween the outer side walls and bead portions of a tire when the latter is clamped in a tiremold, each bead ring including a hollow central portion for reception within the bead opening of a tire and a hollow annular portion joined with said central portion for engaging with the exterior surface of the tirebead and side wall, means securing each bead ring to the exterior of one of said mold sections, said bead rings having heating tubes within said central and annular portions, means for circulating a heat exchange fluid through the tubes of each bead ring, an annular registering tongue and groove in the adjacent surfaces of said central portions of said bead rings, means in one of said bead rings for introducing a fluid under pressure therethrough into the interior of a tire when the latter is confined in said mold.

2. The combination of claim 1 wherein each mold section has an axial opening therethrough, each bead ring having upon its central portion an annular radially outwardly extending shoulder surrounding said axially extending portion and seating upon the mold section upon the peripheral area surrounding said opening.

3. The combination of claim 2 wherein said securing means comprises a radially outwardly projecting annular flange on each bead ring and brackets mounted upon the opposite side walls of said pair of bead rings and engaging the outer side walls of said mold sections and compressively clamping said bead rings by said flanges and brackets to their associated mold sections.

4. The combination of claim 1 wherein said securing means comprises a radially outwardly projecting annular flange on each bead ring and brackets mounted upon the opposite side walls of said pair of bead rings and engaging the outer side walls of said mold sections and compressively clamping said bead rings by said flanges and brackets to the opposite annular faces of their associated mold sections.

5. The combination of claim 1 including gaskets of heat insulating sheet material interposed between said bead rings and the adjacent inner surfaces of the outer side walls of said mold sections.

6. The combination of claim 1 including a sealing ring disposed in said annular groove.

References Cited in the file of this patent

UNITED STATES PATENTS

| | | |
|---|---|---|
| 2,479,493 | Horton-Wellings | Aug. 16, 1949 |
| 2,618,812 | Hulswit et al. | Nov. 25, 1952 |
| 2,659,104 | Glynn | Nov. 17, 1953 |
| 2,697,252 | Clark | Dec. 21, 1954 |
| 2,854,692 | Robbins | Oct. 7, 1958 |
| 2,895,166 | MacMillan | July 21, 1959 |